United States Patent
Mihara

(10) Patent No.: US 8,441,517 B2
(45) Date of Patent: May 14, 2013

(54) DATA PROCESSING APPARATUS AND METHOD, AND NETWORK SYSTEM

(75) Inventor: Hiroaki Mihara, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 811 days.

(21) Appl. No.: 12/591,476

(22) Filed: Nov. 20, 2009

(65) Prior Publication Data

US 2010/0149308 A1 Jun. 17, 2010

(30) Foreign Application Priority Data

Dec. 15, 2008 (JP) ................. 2008-318724

(51) Int. Cl.
*H04N 7/15* (2006.01)
(52) U.S. Cl.
USPC ........................................ 348/14.09; 370/260
(58) Field of Classification Search ............... 348/14.09, 348/14.08; 370/260, 261, 263
See application file for complete search history.

(56) References Cited

U.S. PATENT DOCUMENTS 6,584,077 B1 6/2003 Polomski
7,627,629 B1 * 12/2009 Wu et al. .................... 348/14.09

FOREIGN PATENT DOCUMENTS

| JP | 08-205115 A | 8/1996 |
|----|----|----|
| JP | 2002-176633 A | 6/2002 |
| JP | 2008-259001 A | 10/2008 |

OTHER PUBLICATIONS

Nakano et al., "A Study of Video Quality Improvement for Large Scale Video Conferences," IEICE Technical Report, vol. 107, No. 229, CQ2007-66, 2007 pp. 165-170.
V. Jacobson, Michael J. Karels, "Congestion Avoidance and Control," Proceedings of ACM SIGCOMM, Sep. 1988, pp. 314-329; http://www.cs.rice.edu/~eugeneng/teaching/s04/comp629/papers/Jac88.pdf.
Japanese Office Action dated Nov. 27, 2012 with Partial English translation.

* cited by examiner

*Primary Examiner* — Stella Woo
(74) *Attorney, Agent, or Firm* — Rabin & Berdo, P.C.

(57) ABSTRACT

In a network system for sending data to a plurality of terminals, a data processing apparatus has a plurality of coding units that code outgoing data including at least video or voice data for transmission to terminals over a network. The data processing apparatus obtains information about the terminals, groups the terminals according to the information, and transmits the coded outgoing data obtained from each coding unit to a different group of terminals. Appropriate grouping of the terminals conserves both network and coding resources and enables the quality of the data transmitted to the terminals to be improved at a low cost.

22 Claims, 7 Drawing Sheets

*FIG.3A*

| 1 | 2 |
|---|---|
| 3 | 4 |

*FIG.3B*

| 1 | 2 | 3 |
| | | 6 |
| | 4 | 5 |

*FIG.3C*

| 1 | 2 | 3 | 4 |
| | | | 8 |
| | | | 7 |
| | 5 | 6 | |

*FIG.3D*

| 1 | 2 | 3 | 4 | 5 | 6 |
| | | | | | 10 |
| | | | | | 9 |
| | | | | 8 | |
| | | 7 | | | |

*FIG.3E*

| 1 | 2 | 3 | 4 | 5 |
| | | | | 9 | 13 |
| | | 6 | 7 | 8 | 12 |
| | | | | 11 | |
| | | | 10 | | |

*FIG.3F*

| 1 | 2 | 3 | 4 |
| 5 | 6 | 7 | 8 |
| 9 | 10 | 11 | 12 |
| 13 | 14 | 15 | 16 |

DATA PROCESSING APPARATUS AND METHOD, AND NETWORK SYSTEM

BACKGROUND OF THE INVENTION

1. Field of the Invention

The present invention relates to a data processing apparatus and method and a network system such as a teleconferencing system.

2. Description of the Related Art

Teleconferencing systems in which two or more people at different locations confer over a network commonly employ a device referred to as a multipoint control unit (MCU).

The main functions of the MCU include, besides call control, a computational processing function for receiving and if necessary decoding the voice, video, and data signals arriving from the terminals of the participants in the conference, a selective combining function for selecting and combining the incoming signals, including mixing different voice signals and spatially mixing different video signals, and finally functions for coding the selected and combined signals and distributing the resulting voice, video, and data signals to the conference participants. The coding and decoding functions are carried out by software or hardware devices referred to as codecs.

Transmitting and receiving video over a network requires video codecs that can compress and decompress the video data. The video codecs at both ends must be compatible with regard to coding system, frame rate, image size, and bit rate. By assigning a separate video codec for each participating terminal, and matching the assigned codec to the type of codec used by the terminal, an MCU with multiple video codecs can absorb the incompatibilities between different terminals, so that all types of terminals can connect to the conference and exchange video signals, as described in U.S. Pat. No. 6,584,077 to Polomski.

This type of MCU has the merit of sending each terminal video data that have been coded with the coding system, frame rate, image size, and bit rate optimal for the terminal, and the further merit of minimizing, the transmission of intraframes. An intraframe is a frame that is coded with reference only to itself. Because intraframes have a much lower compression ratio than interframes, which are coded with reference to other frames, the transmission of an intraframe has a negative effect either on the network or on the receiving terminal. The negative effect on the network occurs if the intraframe is coded at full resolution, causing a momentary jump in the amount of data traffic the network must carry. The negative effect on the terminal occurs if the intraframe is coded at reduced resolution, forcing the terminal user to accept a low-quality image. Despite these negative effects, a terminal must occasionally request the transmission of an intraframe because the loss of a data packet in transit on the network has made it impossible to decode an interframe. When this happens, an MCU that uses a separate codec for each connected terminal only has to transmit an interframe to one terminal, so the extent of the negative effect is minimized.

An MCU that uses a separate codec for each terminal, however, can only allow a limited number of terminals to connect to a conference, because each additional connected terminal requires the MCU to operate an additional codec and handle the load of its coding processing. Particularly when the server on which the MCU is implemented is a general-purpose personal computer, the number of terminals that can participate in a conference is severely limited.

An alternative system, described by Nakano et al. in 'Daikibo bideo kaigi ni okeru eizo no hinshitsu kaizen no kento' (A study of video quality improvement for large scale video conferences), *IEICE Technical Report*, Vol. 107, No. 229, CQ2007-66, 2007 pp. 165-170, uses only one video codec per conference and transmits the video output of the codec to all participants in the conference. The transmitted video signal has been coded in such a way that it is receivable by all participating terminals. With this system, when additional participants enter a conference the MCU does not have to provide additional codecs for them, so a conference with a large number of participants can be carried out with a relatively small computational load.

The usage of communication bandwidth can also be greatly reduced by multicasting the video data from the MCU to the connected terminals, but because it is not possible to send each connected terminal optimally coded data, several problems arise that do not occur in Polomski's system.

One problem is that since the video data must be coded by methods compatible with the participating terminal having the most limited capabilities, participants whose terminals support the latest video coding systems, and are capable of receiving and producing large high-definition video images transmitted at high bit rates, must content themselves with the smaller images of poorer quality that can be transmitted at a lower bit rate, using an older coding system. Another problem is that when a particular terminal requests an intraframe from the MCU to provide video data that were lost because of a dropped packet, the MCU must send the intraframe to all terminals. When this happens, all connected terminals experience the negative effects of intraframe transmission, including a temporary increase in network bandwidth usage or the reproduction of a low-resolution video frame, while only one terminal experiences the positive effect of the recovery of a lost image.

The frequency with which intraframes must be transmitted increases with the number of connected terminals. When a conference has several dozen participants, if an intraframe is transmitted in response to every request for an intraframe from a terminal, then even if the network has a comparatively low packet loss rate, substantially continuous intraframe traffic places the network under a constant heavy load, or forces every terminal to accept images of consistently low resolution.

To avoid this problem, Nakano et al. propose to have the MCU transmit only some of the requested intraframes, using a fixed method to select the requests to be honored, but if this practice is followed, on the average a terminal that experiences packet loss must wait longer before recovering a reproducible video image. Terminals with high packet loss rates will tend to lose their video image with annoying frequency.

Given the goal of providing video teleconferencing service with high video quality, the two systems described above both have defects that become increasingly apparent as the number of conference participants increases.

The system proposed by Polomski places too much of a processing load on the MCU. If implemented on a general-purpose personal computer, the MCU is limited to conferences with comparatively few participants. If specialized coding processors are used the number of participants can be increased, but the specialized processors are expensive. Moreover, since the MCU transmits a separate data stream for each terminal, a large conference may overload the network. If network bandwidth is limited, the bit rate must then be reduced, lowering the quality of the transmitted video image.

The system proposed by Nakano et al. forces all terminals to accept a least common denominator of video service. In a large conference, the least common denominator is likely to be lower than the level of service expected by the majority of the conference participants. Moreover, the large number of intraframe requests that tend to occur in a large conference forces all terminals to suffer the negative effects of frequent intraframe transmissions, or forces terminals experiencing high packet loss rates to accept frequent loss of their video image.

Similar problems can also occur in large voice teleconferences.

SUMMARY OF THE INVENTION

An object of the present invention is to provide a low-cost method of transmitting data signals of improved quality to a large number of terminals engaged in a teleconference.

The invention provides a data processing method for coding outgoing data including video and/or voice information and transmitting the coded data to a plurality of terminals. The method includes the steps of:

using a plurality of coding units to code the outgoing data and generate coded outgoing data;

managing terminal information related to communication features of each of the plurality of terminals;

grouping the plurality of terminals into a plurality of groups corresponding to respective coding units, on the basis of the terminal information; and transmitting, to each terminal, the coded outgoing data coded by the coding unit corresponding to the group to which the terminal belongs.

This method is low in cost because it does not require a separate coding unit for each terminal.

For the same reason, the number of terminals that can be served simultaneously is substantially unlimited.

Since the number of transmitted data streams can be reduced to the number of coding units, large conferences need not overload the network on which the data are transmitted, and bit rates need not be reduced as the number of terminals increases. Data of good quality can be transmitted even when the number of terminals is large.

The quality of the transmitted data can also be improved by grouping the terminals according to their communication characteristics. For example, terminals capable of reproducing high-definition video can be placed in a group served by a high-definition coding unit. The terminals can also be grouped according to their packet loss rates, so that intraframe requests from terminals experiencing frequent packet loss do not impair the quality of the video images transmitted to terminals with infrequent packet loss.

The invention also provides a data processing apparatus employing the above method to transmit data to a plurality of terminals, and a network system including the data processing apparatus and the terminals.

BRIEF DESCRIPTION OF THE DRAWINGS

In the attached drawings:

FIGS. 3A to 3F illustrate various spatial mixing patterns for combining video data;

DETAILED DESCRIPTION OF THE INVENTION

Figure 1:
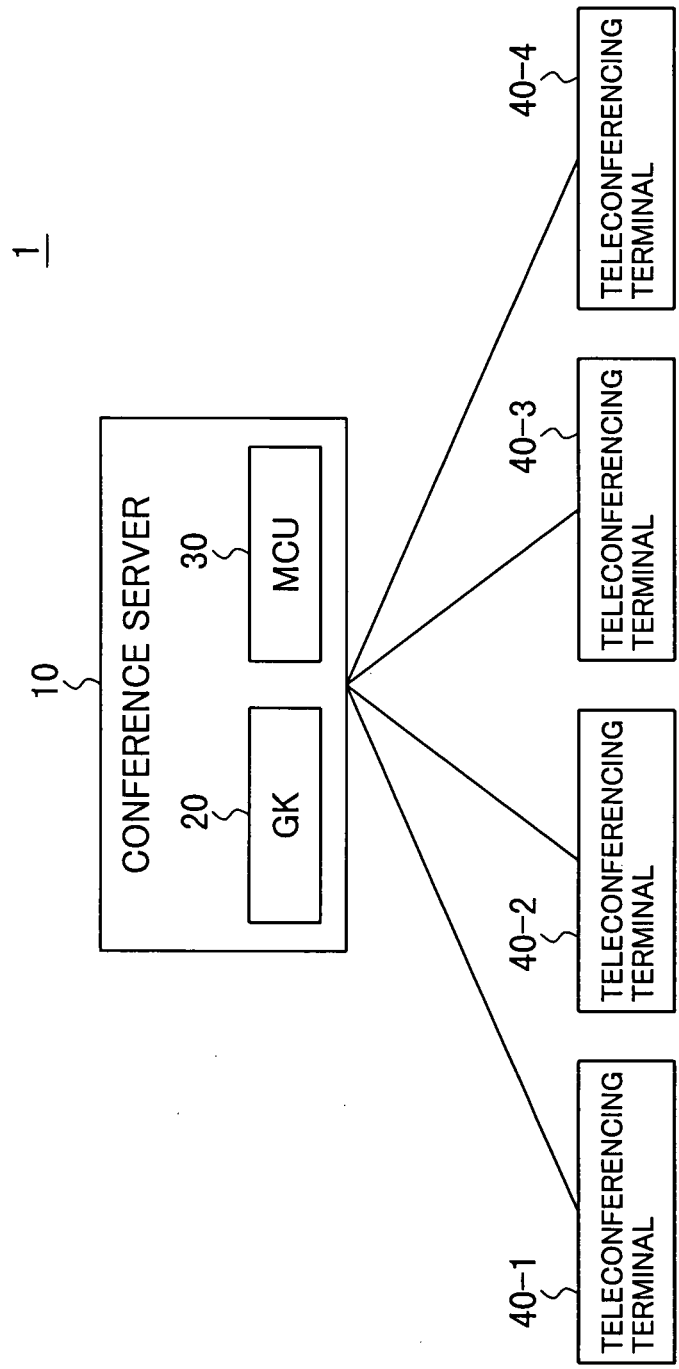
FIG. 1 is a block diagram of a network system including a multipoint control unit.

An embodiment of the invention will now be described with reference to the attached drawings, in which like elements are indicated by like reference characters. The embodiment is a network system, more specifically a video teleconferencing system, including the novel data processing apparatus.

Referring to FIG. 1, the video teleconferencing system 1 has a conference server 10 including a gatekeeper (GK) 20 and a multipoint control unit (MCU) 30. The conference server 10 is connected through a network to four teleconferencing terminals 40-1 to 40-4, which are engaged in a video teleconference.

The gatekeeper 20 gives the teleconferencing terminals 40-1 to 40-4 permission to connect to the conference server 10, and performs functions such as address conversion. The MCU 30 transmits and receives data, including voice data and video data, to and from the teleconferencing terminals 40-1 to 40-4. The conference server 10 provides one or more virtual conference rooms for the teleconferencing terminals 40-1 to 40-4 to use. The MCU 30 selectively combines video data received from teleconferencing terminals using the same conference room and sends the combined data back to these terminals. In the following description, it will be assumed that teleconferencing terminals 40-1 to 40-4 all use the same conference room.

The conference server 10 may combine the video data with voice data collected from the teleconferencing terminals 40-1 to 40-4 and send the combined video and voice data. It will be assumed below that the teleconferencing terminals 40-1 to 40-4 connect to the conference server 10 (MCU 30) by using the H.323 call protocol detailed in Recommendation H.323 of the Telecommunication Standardization Sector of the International Telecommunication Union (ITU-T), entitled 'Packet-based multimedia communications systems, infrastructure of audiovisual services—systems and terminal equipment for audiovisual services', but the call connection method employed with the invention is not limited to H.323.

While connected to the conference server 10, the teleconferencing terminals 40-1 to 40-4 operate as terminals of the conference server 10. The teleconferencing terminals 40-1 to 40-4 may be terminals of the types used in conventional teleconferencing systems. Any number of teleconferencing terminals may be present.

Figure 2:
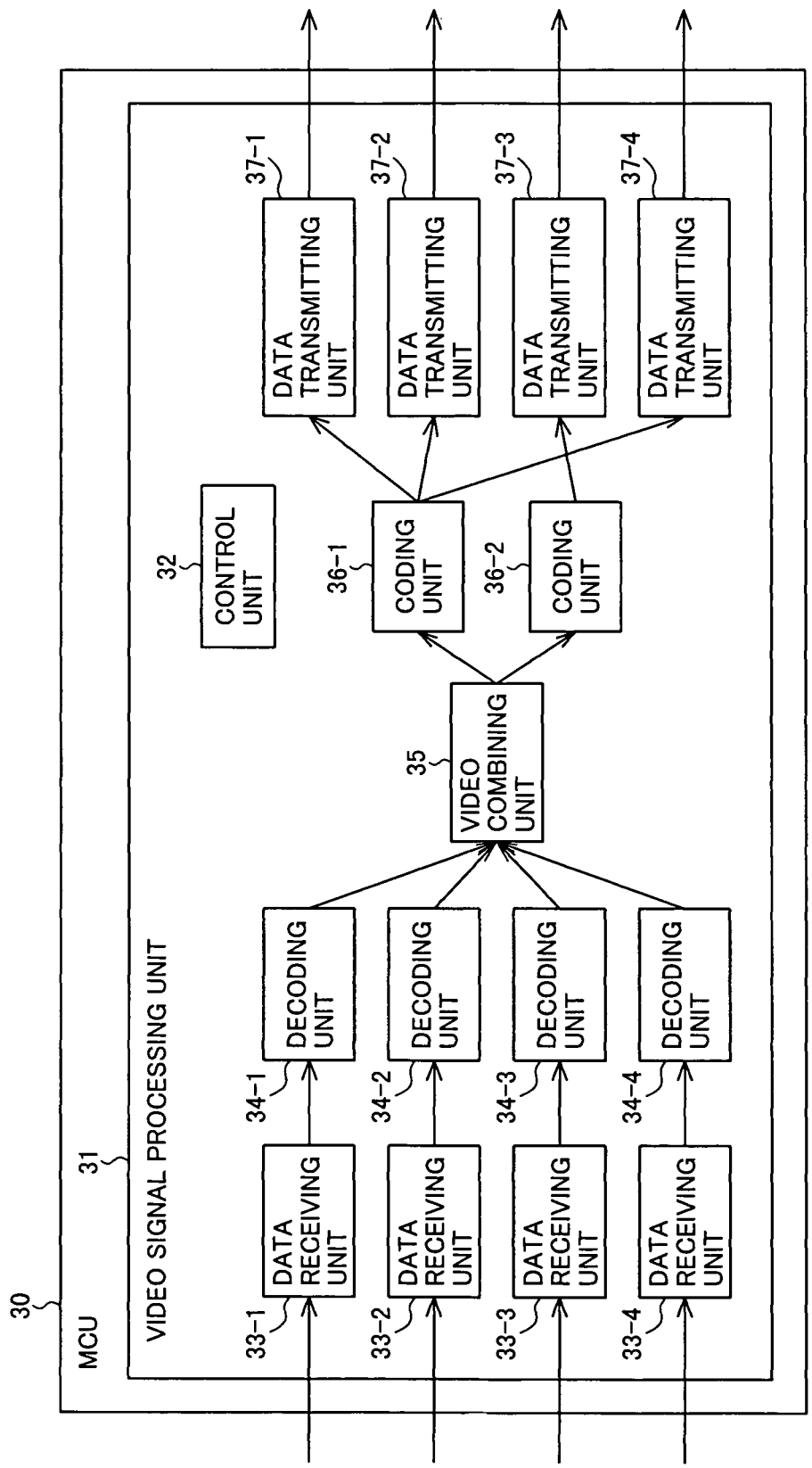
FIG. 2 is a block diagram of a novel data processing apparatus in the multipoint control unit in FIG. 1.

Referring to the block diagram in FIG. 2, the MCU 30 has a video signal processing apparatus 31 for processing video signals. The MCU 30 may also have a voice signal processing apparatus, a data signal processing apparatus, and so on as found in conventional MCUs.

The video signal processing apparatus 31 may be implemented by installing a video signal processing program (including fixed data) on an information processing apparatus such as a personal computer or a plurality of information processing apparatuses configured for distributed processing. Alternatively, some or all of the components of the video signal processing apparatus 31 may be configured as specialized hardware units.

As shown in FIG. 2, the video signal processing apparatus 31 has a control unit 32, data receiving units 33-1 to 33-4, decoding units 34-1 to 34-4, a video combining unit 35, coding units 36-1, 36-2, and data transmitting units 37-1 to 37-4. Where it is not necessary to identify the data receiving units, decoding units, coding units, data transmitting units, and teleconferencing terminals individually below, the final digits and hyphens will be omitted and they will be referred to simply as data receiving units 33, decoding units 34, coding units 36, data transmitting units 37, and teleconferencing terminals 40. The numbers of data receiving units 33, decoding units 34, and data transmitting units 37 are in general equal to the number of teleconferencing terminals 40 connected to the conference.

For each conference room, just a single video combining unit 35 may be provided as shown in FIG. 2, or a plurality of video combining units 35 may be provided. In the latter case, the connections between the video combining units 35 and the coding units 36 can be varied in accordance with instructions from the control unit 32 or a higher-order controller (not shown).

The video combining unit 35 combines video data as illustrated in FIGS. 3A to 3F. When the video combining unit 35 receives video data (frames) from four teleconferencing terminals 40-1 to 40-4, the video data received from each of the teleconferencing terminals 40 may be placed in the four quarters of a single combined frame as illustrated in FIG. 3A.

One or more coding units 36 are provided for each conference room. Coding units 36 may be added or deleted as directed by the control unit 32. The connection relationship between the coding units 36 and the data transmitting units 37 can be changed as directed by the control unit 32, even while the conference is in progress. In this embodiment, the coding parameters specified by the control unit 32 specify the video codec, image size, bit rate, frame rate, and frame type (intraframe or interframe). In general, the coding parameters may include only some of these parameters, and may include other parameters. Any number of coding parameters can be used in any combination.

The control unit 32 collects information about the teleconferencing terminals 40-1 to 40-4 (terminal information) such as their performance parameters and network environment parameters, groups the teleconferencing terminals 40 in accordance with the collected terminal information, and operates each of the coding units 36-1, 36-2 in a way compatible with the parameters of the corresponding group. In this embodiment, the terminal information collected by the control unit 32 includes the packet loss rate of each of the teleconferencing terminals 40-1 to 40-4 and the intraframe transmission rate.

Figure 4:
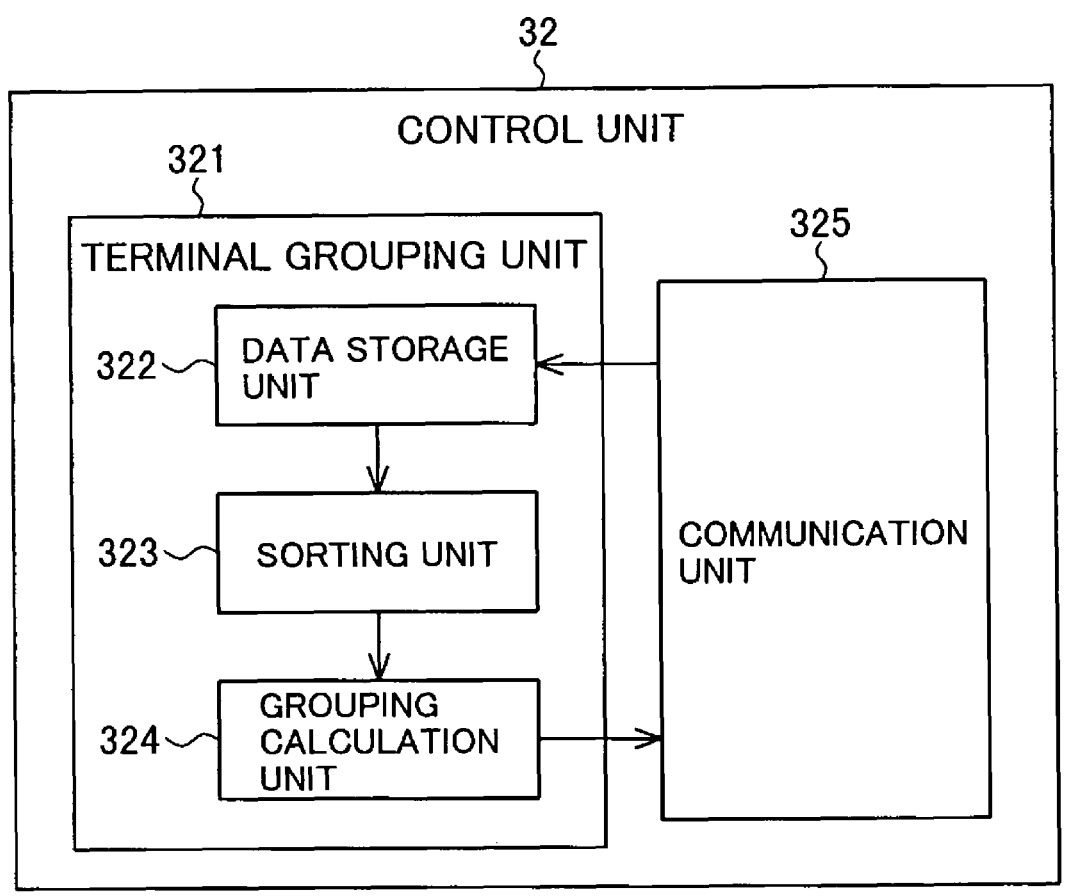
FIG. 4 is a block diagram of the control unit in FIG. 2.

Referring to the block diagram in FIG. 4, the control unit 32 comprises a terminal grouping unit 321 and a communication unit 325. The communication unit 325 has the function of collecting the terminal information. The terminal grouping unit 321, which comprises a data storage unit 322, a sorting unit 323, and a grouping calculation unit 324, has the function of grouping the connected terminals, as described below.

The data storage unit 322 stores the terminal information collected by the communication unit 325. The sorting unit 323 sorts the teleconferencing terminals 40 in ascending or descending order according to the terminal information stored in the data storage unit 322. The grouping calculation unit 324 calculates a point on the sorted list made by the sorting unit 323 at which to divide the teleconferencing terminals 40 into groups.

If, for example, the terminal grouping unit 321 classifies the teleconferencing terminals 40-1 to 40-4 into A types according to their available network bandwidth and B types according to their packet loss rate (A and B are positive integers), the terminal grouping unit 321 can recognize A·B different combinations of available network bandwidth and packet loss rate, and at least A·B different types of codecs suited to these combinations can be created. It is not necessary, however, for the MCU 30 to be able to provide all A·B types of codecs.

Several strategies are available for dealing with, for example, a high packet loss rate. Such strategies include operating at a decreased bit rate or a decreased frame rate, using a video coding method with a high packet loss tolerance, and increasing the intraframe transmission frequency. Different coding units 36 using these different strategies singly or in various combination can be configured, but it is not necessary for the MCU 30 to be able to configure all such possible coding units.

In FIG. 2, in which there are only two coding units, coding unit 36-1 may be configured for normal use and coding unit 36-2 for use with teleconferencing terminals having high packet loss rates. If further coding units become necessary during a video teleconference, they can be added while the teleconference is in progress. Adding a coding unit typically requires only the activation of a pre-existing coding unit or a prestored coding program and does not require the installation of new hardware.

Four methods of obtaining parameters such as the available network bandwidth and the packet loss rate may be considered.

In the first method, the necessary parameters are prestored in the system (in the teleconferencing terminals 40 themselves, or in the conference server 10). The control unit 32 obtains the parameter information during or just after the call setup procedure and determines the connection relationship between the coding units 36 and the data transmitting units 37 in accordance with the obtained information. For example, the parameter information may be obtained as part of the exchange of capabilities information during call setup. Exchange of such information is provided for in ITU-T Recommendation H.245, entitled 'Line Transmission of Non-Telephone Signals, Control Protocol for Multimedia Communication—Systems and terminal equipment for audiovisual services'.

In a second method of determining the grouping of the connection relationship between the coding units 36 and the data transmitting units 37, test packets are transmitted and received between the conference server and the teleconferencing terminals to measure the necessary parameters. The network bandwidth and the packet loss rate of each teleconferencing terminal 40 are determined from the rate at which the test packets can be transmitted and received and the number of test packets lost in transmission.

The network bandwidth and the packet loss rate can be measured by using the packet pair method, as noted by V. Jacobson and Michael J. Karels in 'Congestion Avoidance and Control', *Proceedings of ACM SIGCOMM*, September 1988, pp. 314 to 329. The network bandwidth and packet loss rate can be measured by transmitting test packets at any time before or during the conference connection. The connection relationship between the coding units and the teleconferencing terminals may be changed during a teleconference in response measurements made during the teleconference.

In a third method, information about packet loss rates and jitter delay time is collected by the well-known real-time transport control protocol (RTCP). (The available network bandwidth cannot be known directly.) The RTCP information is updated continuously during the conference connection. The connection relationships of the coding units are determined dynamically on the basis of the current information.

The fourth method is based on intraframe requests. The H.323 protocol defines a method of requesting intraframe transmission. The transmission of an intraframe, containing the information of a single complete frame, is requested when the receiving side cannot decode an interframe because of packet loss or the like. In the video teleconferencing system 1, it is the teleconferencing terminals 40 that request intraframes from the conference server 10. In the fourth method, the control unit 32 calculates the frequency at which intraframes are requested by each teleconferencing terminal 40, and the total frequency of intraframe requests from all the teleconferencing terminals 40, and records the calculated frequencies in the data storage unit 322.

Next, a simple method of grouping the teleconferencing terminals 40 according to their intraframe request rates will be described. In this method, there are two coding units 36-1, 36-2, configured so that in coding the same video data, coding unit 36-2 generates less coded data than coding unit 36-1. For example, coding unit 36-2 may be configured to operate with a lower bit rate or frame rate than coding unit 36-1. For simplicity, all teleconferencing terminals 40 are assumed to be capable of decoding data coded by either coding unit 36-1 or 36-2.

At the start of a video teleconference, all participating teleconferencing terminals 40 are placed in a first group assigned to coding unit 36-1 and the total frequency of intraframe requests this grouping leads to is calculated. If the total frequency exceeds a predetermined threshold value, teleconferencing terminals are reassigned to a second group. Reassignments are made one by one, in descending order of the frequency of intraframe requests by the individual teleconferencing terminals, so that the teleconferencing terminal that makes the most intraframe requests is moved into the second group first. This process continues until the total intraframe request frequency falls below the threshold value.

This simple grouping method can be applied not just to the intraframe request rate but to any numerical parameter that enables the teleconferencing terminals to be sorted in ascending or descending order. For example, this method may be applied to packet loss rate. Values of the numerical parameter may be measured continuously during the video teleconference, or the parameter information may be obtained only at the beginning of the teleconference, or only when a new teleconferencing terminal joins the teleconference.

A more advanced method will now be described under the same assumption of a video teleconference with two coding units 36-1, 36-2, but with no assumption about the amounts of coded data produced by the two coding units. The total number of teleconferencing terminals 40 is an arbitrary positive integer N, not limited to the four shown in FIG. 1.

It will again be assumed that all N teleconferencing terminals 40 can decode the output of either coding unit 36-1 or 36-2. In practice, some teleconferencing terminals may be able to decode the output of only one of the coding units. In that case, such terminals are automatically assigned to the group with the compatible coding unit, and N is the number of terminals that can operate with either coding unit.

The total number of times packet loss is experienced by the N teleconferencing terminals 40 in their incoming data streams over a given period of time will be denoted X. If it is assumed for simplicity that these X packet losses occur in different frames and if each teleconferencing terminal 40 sends an intraframe request to the MCU 30 each time it experiences packet loss, then X intraframes are requested during the given time period.

If a single coding unit were provided for the conference room, as in the system proposed by Nakano et al., and if all intraframe requests were honored, then since each requested intraframe would be sent to all connected terminals, the total number of requested intraframes sent during the given time period would be N·X.

In the present embodiment, however, there are two coding units 36-1, 36-2, and the teleconferencing terminals are divided into groups in a proportion $\alpha(0 \leq \alpha \leq 1)$ such that coding unit 36-1 is connected to $\alpha$·N terminals and coding unit 36-2 is connected to the remaining $(1-\alpha)$·N terminals.

If all of the N teleconferencing terminals 40 have the same packet loss rate, the number of intraframes sent by coding unit 36-1 is $\alpha^2$·N·X, and the number of intraframes sent by coding unit 36-2 is $(1-\alpha)^2$·N·X. The total number of requested intraframes sent over the given time period is given by the following equation (1).

$$\text{(Number of intraframes)} = (2\alpha^2 - 2\alpha + 1) \cdot N \cdot X \tag{1}$$

The minimum number of intraframes given by equation (1) is 0.5·N·X, which is obtained when $\alpha=0.5$. This means that by increasing the number of coding units to two and dividing the teleconferencing terminals into two equal groups, the total number of intraframe transmissions can be halved.

Actual packet loss rates are uneven, and their probability distribution is known to be close to the Pareto distribution. If twenty percent of the teleconferencing terminals 40 (0.2·N) experience eighty percent of the total packet loss (0.8·X), connecting that twenty percent of the teleconferencing terminals 40 to coding unit 36-1 and connecting the remaining eighty percent of the teleconferencing terminals 40 to coding unit 36-2 reduces the total number of intraframe transmissions to $$(0.2 \cdot N \times 0.8 \cdot X) + (0.8 \cdot N \times 0.2 \cdot X) = 0.32 \cdot N \cdot X$$

which is less than the number of intraframe transmissions when the packet loss rates are equal. If ten percent of the terminals experience ninety percent of the packet loss, a similar grouping of the teleconferencing terminals 40 reduces the number of intraframe transmissions to 0.18·N·X.

A method of finding the best grouping based on the packet loss rate will be described next.

If the teleconferencing terminals 40 are divided into two groups in the ratio x:(1−x), where x is a quantity between zero and unity, then there are x·N terminals in the first group and (1−x)·N in the second group. If the total number of interframe requests is divided between the two groups in the ratio (1−y):y, where y is another quantity between zero and unity, then since each intraframe request from a terminal in one of the groups leads to the transmission of an interframe to all the terminals in the same group, the total number of intraframe transmissions can be expressed as z·N², where the quantity z is given by the following equation (2).

$$z = x + y - 2xy \ (0 \leq x \leq 1, 0 \leq y \leq 1) \tag{2}$$

Figure 5:
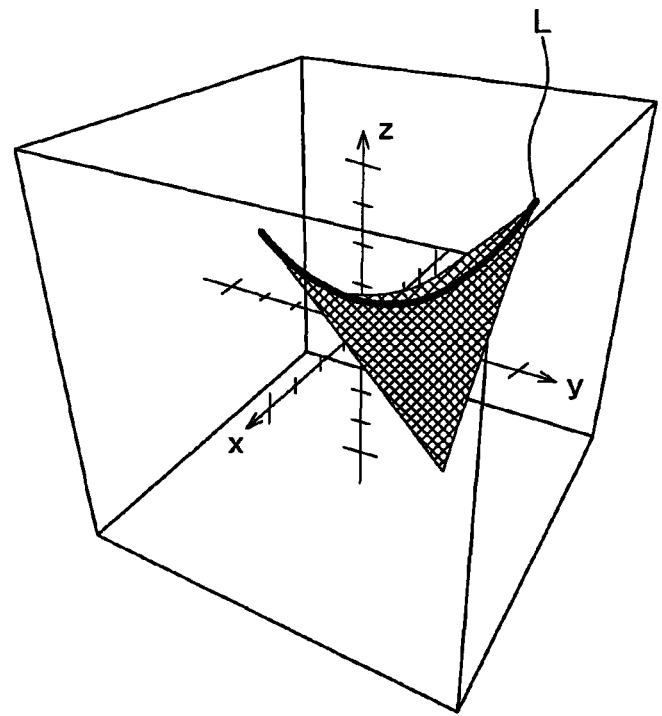
FIGS. 5 and 6 are three-dimensional graphs illustrating a coefficient z calculated by the grouping calculation unit in FIG. 2 as a curved surface.
Figure 6:
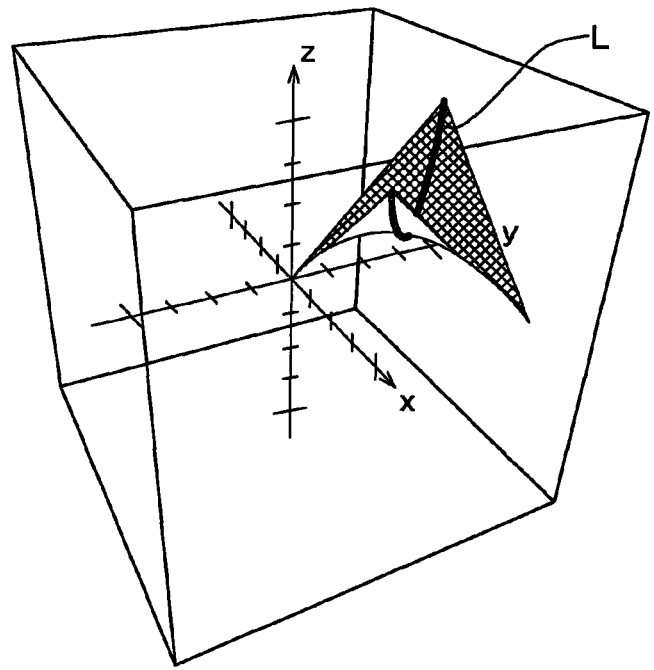

This equation defines a curved surface in a three-dimensional (x-y-z) Cartesian coordinate system. Two views of the curved surface are shown in FIGS. 5 and 6. The curve L represents the possible values of z when the packet loss rate is even, so that x+y=1. The minimum value of z (the lowest number of intraframe transmissions) under this condition is 0.5, attained when x and therefore y are both equal to one-half (x=y=0.5), as explained above. If the packet loss rate is uneven, lower values of z can be obtained by dividing the N terminals into two groups such that y=x≠0.5.

Under the condition that y=x, the curve of values for z (proportional to the total number of intraframe transmissions) becomes a quadratic curve with a maximum value at z=y=x=0.5. The shape of the curved surface shows that the best grouping is one that makes the proportion of terminals in the first group equal to the proportion of intraframe requests generated by the terminals in the second group (x=y), and makes both of these proportions as large as possible, or as small as possible, depending on whether terminals making many intraframe requests are to be assigned to the first group or the second group.

To find this grouping, the sorting unit 323 sorts the N terminals in ascending or descending order of the number of intraframes they request, or in ascending or descending order of their packet loss rates. For each integer k from one to N ($1 \leq k \leq N$), the grouping calculation unit 324 divides the sorted list into two groups, one group including the first to k-th terminals and the other group including the (k+1)-th to N-th terminals, and calculates the resulting value of the quantity z in equation (2) above. The terminals are divided into two groups at the value of k that minimized the value of z.

To reduce the amount of calculation the terminals may be divided into two groups at the value of k that minimizes the absolute difference between x and y (|x−y|), that is, that makes the difference (x−y) as close as possible to zero. In that case, only the value of |x−y| needs to be calculated and not all values of k need to be tested.

The quantities x and y defined as above can also be defined in the following equivalent way: the ratio x:1 is the ratio of the number of terminals in the first group to N (that is, x=k/N); the ratio y:1 is the ratio of the total sum of the values of the intraframe request rates of the terminals in the second group to the total sum of the values of the intraframe request rates of all N terminals.

The same calculations can be made when there are more than two coding units 36. For example, if there are four coding units 36, the two groups of terminals connected to coding units 36-1 and 36-2 can be further subdivided into two groups each, and each of the four resulting groups can be connected to a different coding unit 36. If the packet loss rate is uneven, the number of intraframe transmissions can be reduced to less than one-quarter of the value when all teleconferencing terminals are placed in the same group.

The net effect of increasing the number of coding units (M), thereby increasing the coding calculation load but reducing the number of intraframe transmissions (I), can be evaluated by the product E=M·I. In the environment described above, where there are N terminals and the total number of times incoming packet loss is experienced by all the connected terminals is X, the quantity E in the system proposed by Nakano et al., where only one coding unit is provided per conference room, is $$E=(1)\cdot(N\cdot X)$$

In Polomski's system, where one coding unit is provided for each connected terminal, the quantity E is $$E=(N)\cdot(X)$$

Both of these conventional systems give the same value of E.

In the system of the present invention, however, if the packet loss rate is uneven, the terminals can be grouped in such a manner that the quantity E has less than half the conventional value:

$$E<N\cdot X\div 2$$

In terms of its combined effect on intraframe transmission rate and coding calculation load, the present invention is typically more than twice as efficient as the systems proposed by Polomski and by Nakano et al.

The data transmission operation in the conference server 10 (video signal processing apparatus 31) of the embodiment described above will now be explained with reference to the flowchart in FIG. 7.

When calls are set up between the conference server 10 and the teleconferencing terminals 40-1 to 40-4, the MCU 30 sends control information including video data transmission destination information to each of the teleconferencing terminals 40-1 to 40-4 (S101). The video data transmission destination information gives the address of the server used by the data receiving unit of the video signal processing apparatus 31 and the communication port number. The control unit 32 obtains this information from the video signal processing apparatus 31 before the calls are set up.

After the calls are set up, the teleconferencing terminals begin sending video data to the video signal processing apparatus 31. In the video signal processing apparatus 31, a data receiving unit 33 and a decoding unit 34 are created for each teleconferencing terminal 40 (S102). Separate data receiving units 33-1 to 33-4 and decoding units 34-1 to 34-4 are created because the conference server 10 sets up a separate call with each of the teleconferencing terminals 40-1 to 40-4.

The data receiving units 33-1 to 33-4 receive video image data from the teleconferencing terminals 40-1 to 40-4, and the decoding units 34-1 to 34-4 decode the received image data to obtain respective luminance-chrominance (YUV) or red-green-blue (RGB) image data (S103).

The decoding units 34-1 to 34-4 send the decoded image data to the video combining unit 35, where the data are combined in a pattern specified by the control unit, such as the pattern in FIG. 3A (S104).

The video combining unit 35 supplies the combined image data to the coding units 36-1 and 36-2, where the combined image data are coded in accordance with coding parameters specified by the control unit 32 (S105).

The video data coded by the coding units 36-1 and 36-2 are sent to the corresponding data transmitting units 37-1 to 37-4 as instructed by the control unit 32 and then sent via one or more networks to the teleconferencing terminals 40-1 to 40-4 (S106). The process in steps S103 to S106 is repeated until the conference ends.

Figure 8:
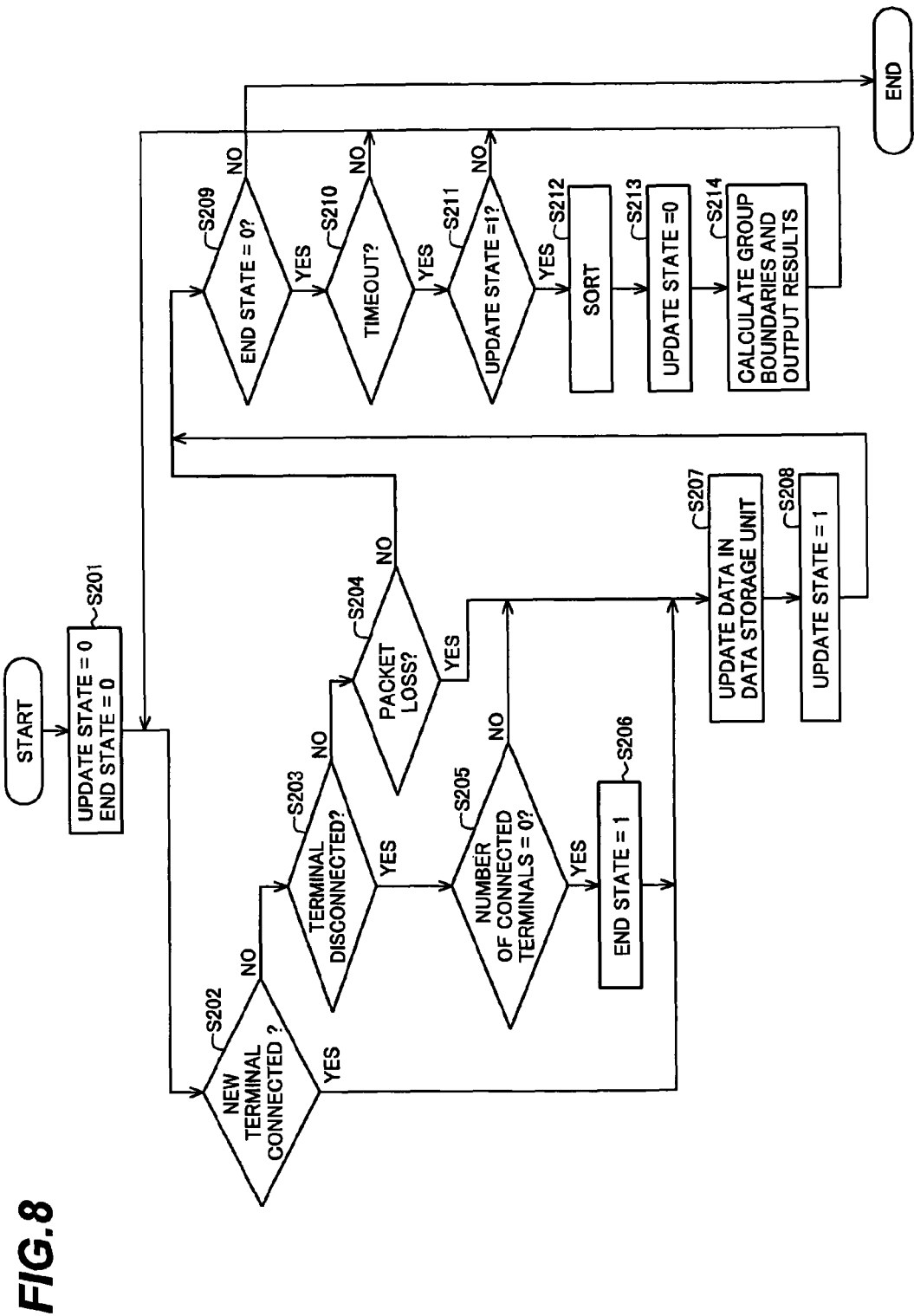
FIG. 8 is a flowchart illustrating the operation of the control unit in the video signal processing apparatus embodying the invention.

The operation of the control unit 32 will now be described in more detail with reference to the flowchart in FIG. 8. The illustrated operation for determining the grouping of the connection relationship between the coding units 36 and data transmitting units 37 uses an update state variable to indicate that a terminal has joined or left the conference, or has lost a packet, and an end state variable to indicate that the conference has ended.

When the first teleconferencing terminal 40 is connected to the conference server 10, the update state and the end state are initialized to '0' (S201). The following steps are then executed repeatedly in a loop controlled by a timer (not shown) that sets a timeout flag at regular intervals.

The communication unit 325 informs the terminal grouping unit 321 of the connection of a new terminal (S202), disconnection of a terminal (S203), packet loss at a connected terminal (S204), and reduction of the number of connected terminals to zero (S205), and sets the end state variable to '1' when the number of connected terminals is reduced to zero (S206). When there is no new terminal connection or disconnection and no packet loss, the process jumps from step S204 to step S209, which will be described later. In other cases the process proceeds to step S207, which will be described next.

When a terminal is newly connected or disconnected or experiences packet loss, the terminal grouping unit 321 stores the terminal ID, event type (terminal connection, terminal disconnection, or packet loss), and occurrence time in the data storage unit 322 (S207) on the basis of the information supplied by the communication unit 325, sets the update state to '1' (S208), and then proceeds to step S209.

Step S209 tests the end state variable. If the end state is '1', the process ends. If the end state is '0', the timeout flag is tested (S210). If the timeout flag is not set, the process returns to step S202 to repeat the loop. If the timeout flag is set, the process proceeds to step S211.

Step S211 tests the update state variable. If the update state is '0', the process returns to step S202. If the update state is '1', the sorting unit 323 collects the packet loss information from the current time to a given time in the past, sorts the teleconferencing terminals 40 in ascending or descending order of their packet loss rates during this time interval (S212), and clears the update state variable to '0' (S213). The grouping calculation unit 324 then divides the teleconferencing terminals 40 into groups (S214) by using one of the methods described above to calculate one or more group boundaries in the sorted list of terminals created by the sorting unit 323. On the basis of the resulting grouped list of terminals, the control unit 32 issues instructions to update the connections between the coding units 36 and the data transmitting units 37, and the process returns to step S202.

The effect of this process is to update the connection relationships between the participating teleconferencing terminals 40 and the coding units 36 at intervals set by the timer until the conference ends. As terminals join or leave the conference, and as their packet loss rates change, the connection relationships are changed accordingly.

A basic advantage of the novel teleconferencing system 1 is that the conference server 10 can send high-quality video data to the teleconferencing terminals 40 capable of receiving such data, without causing network overload by attempting to send high-quality video data to all the teleconferencing terminals 40, and without requiring a separate coding unit for every teleconferencing terminal.

Another advantage is that the total number of intraframes transmitted by the conference server 10 can be reduced by placing teleconferencing terminals 40 that require frequent intraframe transmissions and teleconferencing terminals 40 that require comparatively few intraframe transmissions in separate groups. This enables frequent intraframes to be sent to the teleconferencing terminals 40 that need them without causing network overload.

Similarly, teleconferencing terminals 40 with high packet loss rates and teleconferencing terminals 40 with low packet loss rates can be placed in separate groups, and the teleconferencing terminals 40 with high packet loss rates can be served by coding units 36 that output data at reduced bit rates. A reduced bit rate increases the probability that a terminal will be able to receive a complete frame without packet loss, so this grouping strategy reduces the number of intraframes requested by the terminals that generate most of the intraframe requests, making more network bandwidth available and therefore enabling higher-quality video to be sent to all terminals.

Lowering the bit rates of terminals with high packet loss rates also reduces the number of packets that get lost during a conference, and accordingly reduces the number of packets must be retransmitted, again making more network bandwidth available.

In the system proposed by Nakano et al., which uses only one coding unit, there is a direct trade-off between bit rate and intraframe transmission rate, and there is a tendency for the intraframe transmission rate to increase as the square of the number of teleconferencing terminals. In large conferences, the system is forced to choose either a drastic reduction in bit rate and image quality or a drastic reduction of the number of intraframe requests honored, again with drastic effects on image quality.

The novel teleconferencing system 1 provides a way around this trade-off, so that all terminals can enjoy better service than in the system proposed by Nakano et al. In particular, no terminal users have to suffer the annoyance of persistent loss of video image, persistent blur, or persistent blocky images.

Since one coding unit 36 is provided for each group of teleconferencing terminals 40, the number of coding units 36 can be much less than the number of teleconferencing terminals 40, and the cost of sending send high-quality video data can be much less than in Polomski's system, in which each teleconferencing terminal 40 requires a separate coding unit 36. In addition, for the same cost, the novel teleconferencing system 1 can handle much larger conferences than would be possible in Polomski's system.

A further advantage of the novel teleconferencing system 1 is its ability to change the connections between coding units 36 and teleconferencing terminals 40 dynamically, in response to changing conditions during a conference. This ability contrasts with the fixed connection schemes used by Nakano et al. and Polomski.

The present invention is not limited to the embodiment described above. The following are some of the many possible modifications.

Figure 7:
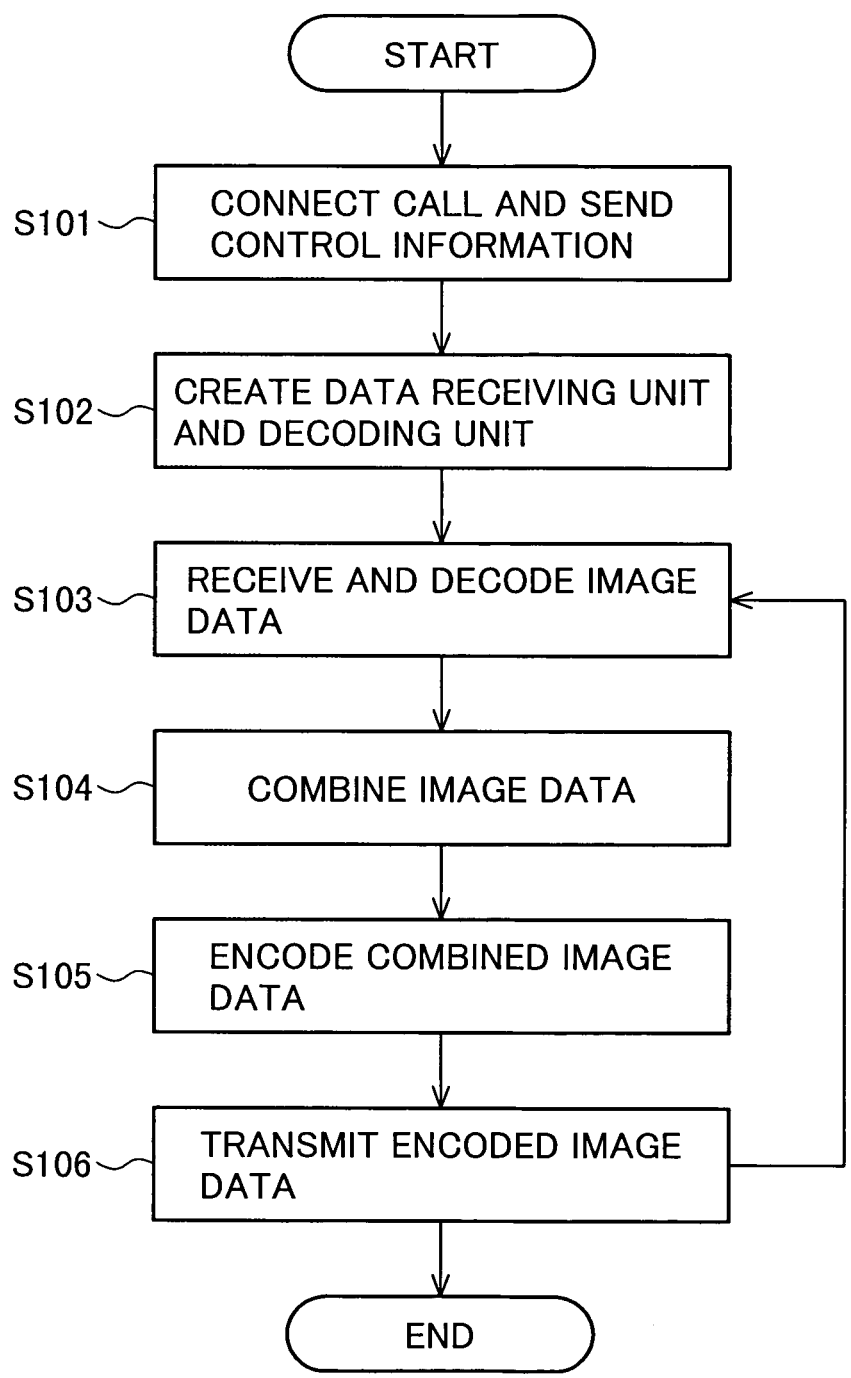
FIG. 7 is a flowchart illustrating the operation of a video signal processing apparatus embodying the invention.

When the video combining unit 35 combines image data received from the teleconferencing terminals in step S104 in FIG. 7, it may superimpose text information converted to image data on the combined image. When the video combining unit 35 adds text information in this way, before superimposing the added text, it may alter the brightness and saturation of the received image data in the area in which the added text will appear, to darken or brighten the image in that area and make the added text stand out better.

When the video combining unit 35 superimposes text information on the combined image it may also move the text information by, for example, displacing the text information by a certain number of pixels at regular intervals, so that the text information appears to scroll vertically or horizontally on the screen.

The video combining unit 35 may also superimpose the same text information alternately in two slightly different positions on the combined image, changing the position at intervals of a certain number of frames, so that the superimposed text appears to vibrate.

When combining the received image data, at the direction of the control unit 32, the video combining unit 35 may also add borders around each combined image, or at selected boundaries between images, to help the terminal users distinguish between the different video channels.

The ability of the video combining unit 35 to display added text in different positions or add borders in selected positions can also be used to obtain effects such as highlighting the image of the person currently speaking, by responding to instructions issued from the control unit 32 in accordance with the volume of voice signals sent from the teleconferencing terminals.

In the embodiment described above, the invention is applied to a video signal processing apparatus. The present invention may also be applied, however, to a voice signal processing apparatus or a combined voice and video signal processing apparatus, as noted above. That is, the data sent from the novel data processing apparatus to the connected terminals include voice data, video data, or both voice and video data.

If the novel data processing apparatus is used to send voice data, the decoding unit 34, video combining unit 35, and coding units 36 in FIG. 2 should be replaced with corresponding units for processing voice data. Since intraframe requests do not occur in voice transmission, the grouping of the teleconferencing terminals 40 to determine the connection relationship between the coding units 36 and the data transmitting units 37, or the relationship between the coding units 36 that code the voice data and the teleconferencing terminal 40 to which the coded voice data are sent, may be based only on the packet loss rate and the capabilities of the connected terminals and networks.

Although the data processing apparatus of the present invention is implemented on a conference server in the embodiment described above, the invention is not limited to use in teleconferencing systems. The novel data processing apparatus may be used in any network system that codes the same data for transmission to terminals with different communication capabilities or different network environments.

For example, the present invention may be applied to a one-way data transmission system, such as a real time video distribution system or a remote teaching system, that sends data from a data processing apparatus to a plurality of terminals but does not obtain the data to be transmitted from the terminals themselves. In that case, the data receiving unit 33, decoding unit 34, and video combining unit 35 shown in FIG. 2 may be replaced by a device such as a video camera or a video data storage device.

In the embodiment described above, there are equal numbers of data transmitting units 37 and teleconferencing terminals 40, and the video signal processing apparatus 31 unicasts a separate data stream to each teleconferencing terminal 40. In a variation of the embodiment, the number of data transmitting units 37 is reduced to the number of coding units 36 and each data transmitting units 37 performs a multicast data transmission to all of the teleconferencing terminals 40 in one group. This modification can reduce the processing load on the video signal processing apparatus 31 and the usage of network bandwidth. Dynamic switching of the connection relationships between the coding units 36 and the teleconferencing terminals 40 can be carried out by allowing a teleconferencing terminal 40 to switch its connection from one data transmitting unit 37 to another in response to a channel switching instruction given by the video signal processing apparatus 31.

Those skilled in the art will recognize that further variations are possible within the scope of the invention, which is defined in the appended claims.

What is claimed is:

1. A data processing apparatus for coding outgoing data including video and/or voice information and transmitting the coded data to a plurality of terminals, the data processing apparatus comprising:
   a plurality of coding units for coding the outgoing data to generate coded outgoing data;
   a terminal information management unit for managing terminal information related to communication features of each of the plurality of terminals;
   a terminal grouping unit for grouping the plurality of terminals into a plurality of groups corresponding to respective coding units in the plurality of coding units, on the basis of the terminal information managed by the terminal information management unit; and
   a data transmitting unit for transmitting, to each one of the groups of terminals, the coded outgoing data coded by the corresponding one of the coding units, wherein
   each of the coding units performs both intraframe and interframe coding of video data,
   the data transmitting unit transmits the data coded by the coding units in packets,
   the terminal information managed by the terminal information management unit includes a numerical parameter for each of the terminals, and
   the numerical parameter represents a packet loss rate.

2. The data processing apparatus of claim 1, wherein the data processing apparatus is implemented on a server in a teleconferencing system including the server and a plurality of teleconferencing terminals, said terminals being the teleconferencing terminals.

3. A network system including the data processing apparatus of claim 1 and a plurality of terminals to which the data processing apparatus transmits the coded outgoing data.

4. A data processing apparatus for coding outgoing data including video and/or voice information and transmitting the coded data to a plurality of terminals, the data processing apparatus comprising:
   a plurality of coding units for coding the outgoing data to generate coded outgoing data;
   a terminal information management unit for managing terminal information related to communication features of each of the plurality of terminals;
   a terminal grouping unit for grouping the plurality of terminals into a plurality of groups corresponding to respective coding units in the plurality of coding units, on the basis of the terminal information managed by the terminal information management unit; and
   a data transmitting unit for transmitting, to each one of the groups of terminals, the coded outgoing data coded by the corresponding one of the coding units, wherein
   each of the coding units performs both intraframe and interframe coding of video data,
   the data transmitting unit transmits the data coded by the coding units in packets,
   the terminal information managed by the terminal information management unit includes a numerical parameter for each of the terminals, and
   the numerical parameter represents an intraframe request rate.

5. The data processing apparatus of claim 4, wherein the data processing apparatus is implemented on a server in a teleconferencing system including the server and a plurality of teleconferencing terminals, said terminals being the teleconferencing terminals.

6. A network system including the data processing apparatus of claim 4 and a plurality of terminals to which the data processing apparatus transmits the coded outgoing data.

7. A data processing apparatus for coding outgoing data including video and/or voice information and transmitting the coded data to N terminals, N being an integer greater than 2, the data processing apparatus comprising:
   two coding units for coding the outgoing data to generate coded outgoing data;
   a terminal information management unit for managing terminal information related to communication features of each of the N terminals;
   a terminal grouping unit for grouping the N terminals into two groups corresponding to respective ones of the two coding units, on the basis of the terminal information managed by the terminal information management unit; and
   a data transmitting unit for transmitting, to each of the two groups of terminals, the coded outgoing data coded by the corresponding one of the two coding units, wherein
   each of the two coding units performs both intraframe and interframe coding of video data,
   the data transmitting unit transmits the data coded by the two coding units in packets, and the terminal information managed by the terminal information management unit includes a numerical parameter for each of the N terminals; and wherein the terminal grouping unit includes a sorting unit for sorting the N terminals in ascending or descending order of their values of the numerical parameter, and a grouping calculation unit for selecting an integer k between 1 and N, placing the first to k-th terminals in the sorted order in a first group corresponding to one of the two coding units, and placing the (k+1)-th to N-th terminals in the sorted order in a second group corresponding to the other one of the two coding units.

8. The data processing apparatus of claim 7, wherein the grouping calculation unit selects the integer k that minimizes an absolute value |x−y|, where x:1 is a ratio of the number of terminals in the first group to N and y:1 is a ratio of a total sum of the values of the numerical parameter of the terminals in the second group to a total sum of the values of the numerical parameter for all N terminals.

9. The data processing apparatus of claim 7, wherein the grouping calculation unit selects the integer k that minimizes a quantity z defined as $$z = x + y - 2xy$$

where x:1 is a ratio of the number of terminals in the first group to N and y:1 is a ratio of a total sum of the values of the numerical parameter of the terminals in the second group to a total sum of the values of the numerical parameter for all N terminals.

10. The data processing apparatus of claim 7, wherein the data processing apparatus is implemented on a server in a teleconferencing system including the server and a plurality of teleconferencing terminals, said terminals being the teleconferencing terminals.

11. A network system including the data processing apparatus of claim 7 and a plurality of terminals to which the data processing apparatus transmits the coded outgoing data.

12. A data processing apparatus for coding outgoing data including video and/or voice information and transmitting the coded data to a plurality of terminals, the data processing apparatus comprising:

a plurality of coding units for coding the outgoing data to generate coded outgoing data;

a terminal information management unit for managing terminal information related to communication features of each of the plurality of terminals;

a terminal grouping unit for grouping the plurality of terminals into a plurality of groups corresponding to respective coding units in the plurality of coding units, on the basis of the terminal information managed by the terminal information management unit; and a data transmitting unit for transmitting, to each one of the groups of terminals, the coded outgoing data coded by the corresponding one of the coding units, wherein the plurality of coding units includes a first coding unit and a second coding unit, the second coding unit producing less coded data than the first coding unit, the terminal information managed by the terminal information management unit includes a numerical parameter, and the terminal grouping unit includes a sorting unit for sorting the terminals in ascending or descending order of their values of the numerical parameter, and a grouping calculation unit for placing all the terminals in a first group receiving the coded outgoing data coded by the first coding unit, then moving the terminals one by one, in descending order of the numerical parameter, from the first group into a second group receiving the coded outgoing data coded by the second coding unit, thereby reducing the value of the numerical parameter of the terminals moved into the second group, until a total sum of the values of the numerical parameter for all of the terminals falls below a threshold value; and wherein the first coding unit and the second coding unit both perform intraframe and interframe coding of video data and the numerical parameter represents an intraframe request rate.

13. The data processing apparatus of claim 12, wherein the data processing apparatus is implemented on a server in a teleconferencing system including the server and a plurality of teleconferencing terminals, said terminals being the teleconferencing terminals.

14. A network system including the data processing apparatus of claim 12 and a plurality of terminals to which the data processing apparatus transmits the coded outgoing data.

15. A data processing method for coding outgoing data including video and/or voice information and transmitting the coded data to a plurality of terminals, the data processing method comprising:

coding the outgoing data to generate coded outgoing data using a plurality of coding units;

managing terminal information related to communication features of each of the plurality of terminals;

grouping the plurality of terminals into a plurality of groups corresponding to respective coding units in the plurality of coding units, on the basis of the managed terminal information; and transmitting, to each one of the groups of terminals, the coded outgoing data coded by the corresponding one of the coding units, wherein coding the outgoing data by means of each of the coding units performs both intraframe and interframe coding of video data, transmitting the coded outgoing data transmits the data coded by the coding units in packets, the terminal information includes a numerical parameter for each of the terminals, and the numerical parameter represents a packet loss rate.

16. A non-transitory machine-readable medium storing instructions executable by a computing device to execute data processing by the method of claim 15.

17. A data processing method for coding outgoing data including video and/or voice information and transmitting the coded data to a plurality of terminals, the data processing method comprising:

coding the outgoing data to generate coded outgoing data using a plurality of coding units;

managing terminal information related to communication features of each of the plurality of terminals;

grouping the plurality of terminals into a plurality of groups corresponding to respective coding units in the plurality of coding units, on the basis of the managed terminal information; and transmitting, to each one of the groups of terminals, the coded outgoing data coded by the corresponding one of the coding units, wherein coding the outgoing data by means of each of the coding units performs both intraframe and interframe coding of video data, transmitting the coded outgoing data transmits the data coded by the coding units in packets, the terminal information includes a numerical parameter for each of the terminals, and the numerical parameter represents an intraframe request rate.

18. A non-transitory machine-readable medium storing instructions executable by a computing device to execute data processing by the method of claim 17.

19. A data processing method for coding outgoing data including video and/or voice information and transmitting the coded data to N terminals, N being an integer greater than two, the data processing method comprising:

coding the outgoing data to generate coded outgoing data using two coding units;

managing terminal information related to communication features of each of the N terminals;

grouping the N terminals into two groups corresponding to respective ones of the two coding units, on the basis of the managed terminal information; and transmitting, to each one of the groups of terminals, the coded outgoing data coded by the corresponding one of the coding units, wherein coding the outgoing data by means of each of the two coding units performs both intraframe and interframe coding of video data, transmitting the coded outgoing data transmits the data coded by the two coding units in packets, and the terminal information includes a numerical parameter for each of the terminals; and wherein grouping the N terminals further includes sorting the N terminals in ascending or descending order of their values of the numerical parameter, and selecting an integer k between 1 and N, placing the first to k-th terminals in the sorted order in a first group corresponding to one of the two coding units, and placing the (k+1)-th to N-th terminals in the sorted order in a second group corresponding to the other one of the two coding units.

20. A non-transitory machine-readable medium storing instructions executable by a computing device to execute data processing by the method of claim 19.

21. A data processing method for coding outgoing data including video and/or voice information and transmitting the coded data to a plurality of terminals, the data processing method comprising:

coding the outgoing data to generate coded outgoing data using a plurality of coding units;

managing terminal information related to communication features of each of the plurality of terminals;

grouping the plurality of terminals into a plurality of groups corresponding to respective coding units in the plurality of coding units, on the basis of the managed terminal information; and transmitting, to each one of the groups of terminals, the coded outgoing data coded by the corresponding one of the coding units, wherein coding by means of the plurality of coding units includes coding by means of a first coding unit and coding by means of a second coding unit, coding by means of the second coding unit produces less coded data than coding by means of the first coding unit, the terminal information includes a numerical parameter, and grouping the terminals further includes sorting the terminals in ascending or descending order of their values of the numerical parameter, and placing all the terminals in a first group receiving the coded outgoing data coded by the first coding unit, then moving the terminals one by one, in descending order of the numerical parameter, from the first group into a second group receiving the coded outgoing data coded by the second coding unit, thereby reducing the value of the numerical parameter of the terminals moved into the second group, until a total sum of the values of the numerical parameter for all of the terminals falls below a threshold value, wherein coding by means of the first coding unit and coding by means of the second coding unit both perform intraframe and interframe coding of video data and the numerical parameter represents an intraframe request rate.

22. A non-transitory machine-readable medium storing instructions executable by a computing device to execute data processing by the method of claim 21.

* * * * *